United States Patent [19]
Meyer

[11] Patent Number: 6,076,786
[45] Date of Patent: Jun. 20, 2000

[54] ADJUSTABLE VIDEO DISPLAY SCREEN

[76] Inventor: Steve W. Meyer, 2629 Mossvine Dr., Carrollton, Tex. 75007

[21] Appl. No.: 09/044,518

[22] Filed: Mar. 19, 1998

[51] Int. Cl.[7] .................................................... F16M 11/00
[52] U.S. Cl. ............................ 248/161; 248/917; 248/920
[58] Field of Search ..................................... 248/917, 919, 248/921, 922, 923, 161, 157, 420, 346.03, 346.04; 361/681; 312/223.2; 349/58

[56] References Cited

U.S. PATENT DOCUMENTS

| | | | |
|---|---|---|---|
| 5,205,017 | 4/1993 | Wang | 391/681 X |
| 5,206,790 | 4/1993 | Thomas et al. | 361/681 |
| 5,229,920 | 7/1993 | Spaniol et al. | 361/681 X |
| 5,255,214 | 10/1993 | Ma | 361/681 X |
| 5,333,116 | 7/1994 | Hawkins et al. | 361/681 |
| 5,708,561 | 1/1998 | Huilgol et al. | 361/681 |
| 5,729,429 | 3/1998 | Margaritis | 248/919 X |
| 5,768,096 | 6/1998 | Williams et al. | 361/681 |
| 5,812,368 | 9/1998 | Chen et al. | 248/922 X |
| 5,870,280 | 2/1999 | Cho | 248/921 X |
| 5,915,658 | 6/1999 | Sheng | 248/917 X |

Primary Examiner—Ramon O. Ramirez
Assistant Examiner—David Heisey
Attorney, Agent, or Firm—John E. Vandigriff

[57] ABSTRACT

The invention is an enhancement to video display screens which enables enhanced adjustment to the position of the video display screen. The invention enables a user to easily raise the video display screen a variable number of inches vertically above, for example, the keyboard of a computer, or a desk top, or to move the display closer to or farther away from the viewer. The display adjustment mechanism is enclosed in a compartment behind the display screen and a portion slides out of the compartment as the user lifts the display upward from its lowest position. A pressure release button releases meshed teeth between a lock bar and a stabilizer bar. When engaged, the teeth hold the display in a desired vertical position. The display can also be rotated about 180 degrees in either direction relative to the keyboard, desk top or other device. The display may also be tilted forward or back to position the screen in a desired position.

16 Claims, 9 Drawing Sheets

ADJUSTABLE VIDEO DISPLAY SCREEN

FIELD OF THE INVENTION

The invention relates to video display screens, and more particularly to an adjustable video display screen for electronic devices utilizing a display screen, including flat screen display panels, televisions and notebook computers.

BACKGROUND OF THE INVENTION

Notebook computers have video display screens, which when open, are usually at a position which causes the user to look too far downward, bending the neck to a strained position resulting in muscle pain to the neck, back arms, and also eye strain. Desktop computers and other devices can also have fixed displays which can cause strain and sore necks. It has been found that minimum neck strain is produced when the height of the display is at a position so that the neck is in a neutral position, for example, from zero to about 15 degrees in the downward position.

Notebook computers have been designed such that the display may tilt forward or backward, and may rotate. Such a design is found in U.S. Pat. No. 5,168,423.

Another design, found in U.S. Pat. No. 5,125,610, allows the display to tilt forward on two arms, and also tilt up and down on the same arms. This allows some height adjustment of the display, and also permits the display to be tilted from a vertical position.

SUMMARY OF THE INVENTION

The invention is an enhancement to video display screens which enables enhanced adjustment to the position of the video display screen. The invention enables a user to easily raise the video display screen a variable number of inches vertically above, for example, the keyboard of a computer, or a desk top, or to move the display closer to or farther away from the viewer, and to rotate the display horizontally. The user is therefore able to control the closeness, height, and angle of the display combined with the unlimited tilt and rotation.

The display adjustment mechanism is enclosed in a compartment behind the display screen and a portion slides out of the compartment as the user lifts the display upward from its lowest position. A pressure release button releases meshed teeth between a lock bar and a stabilizer bar. When engaged, the teeth hold the display in a desired vertical position. The display can also be rotated about 180 degrees in either direction relative to the keyboard, desk top or other device. The display may also be tilted forward or back to position the screen in a desired position.

DESCRIPTION OF A PREFERRED EMBODIMENT

Figure 1:
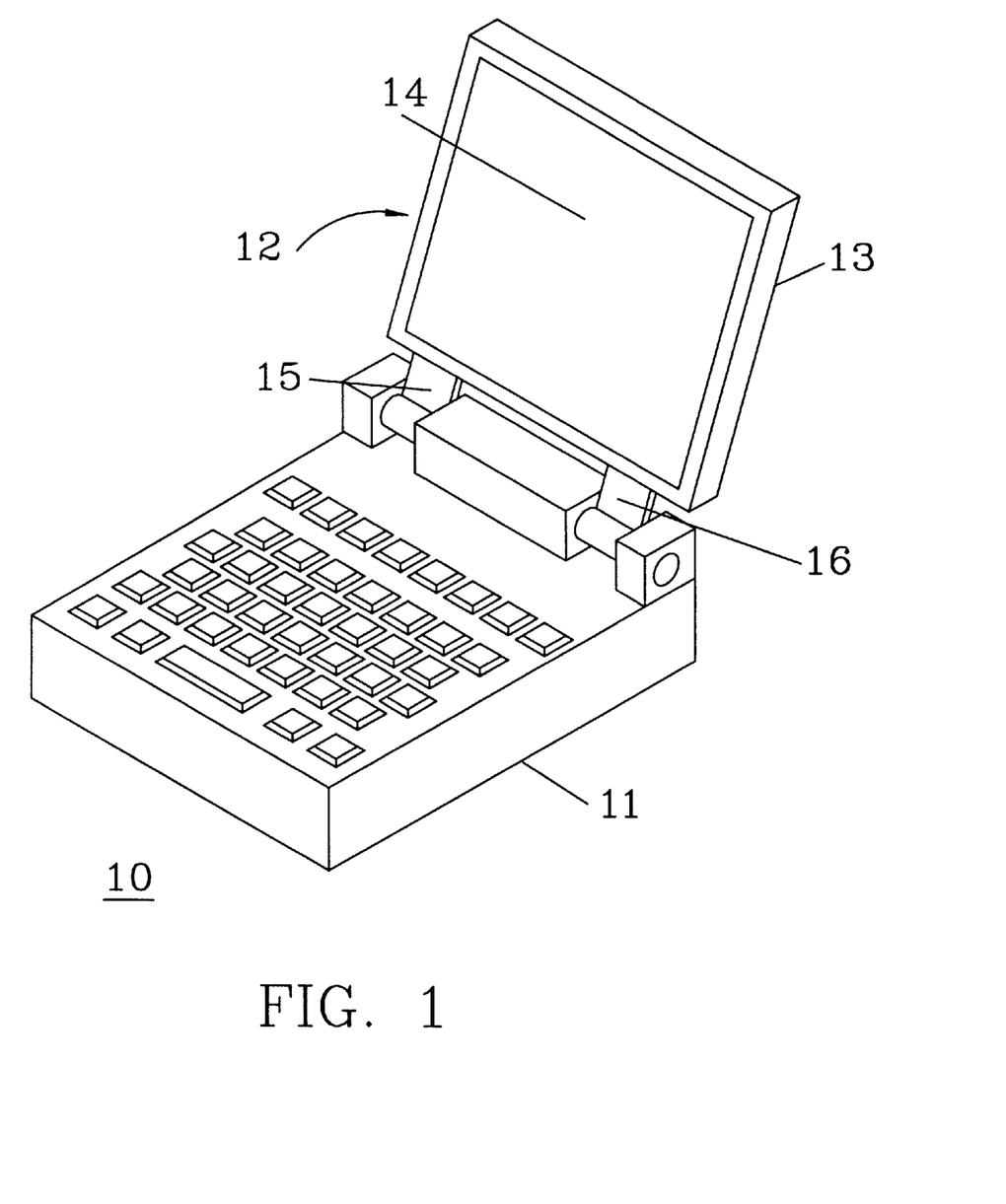
FIG. 1 illustrates an open notebook computer according to the present invention.

The invention is a mechanism to enable enhanced adjustment to the position of a video display screen. The preferred embodiment illustrates an adjustable notebook computer display that may be raised and lowered, tilted, and rotated. In FIG. 1, computer 10 has a base unit 11 and a display 12 mounted on hinges 15 and 16. Display 12 has a frame 13 with the display screen 14 mounted on the front side (as illustrated) and a mounting panel and raising mechanism is in the back side, as described below.

Figure 2:
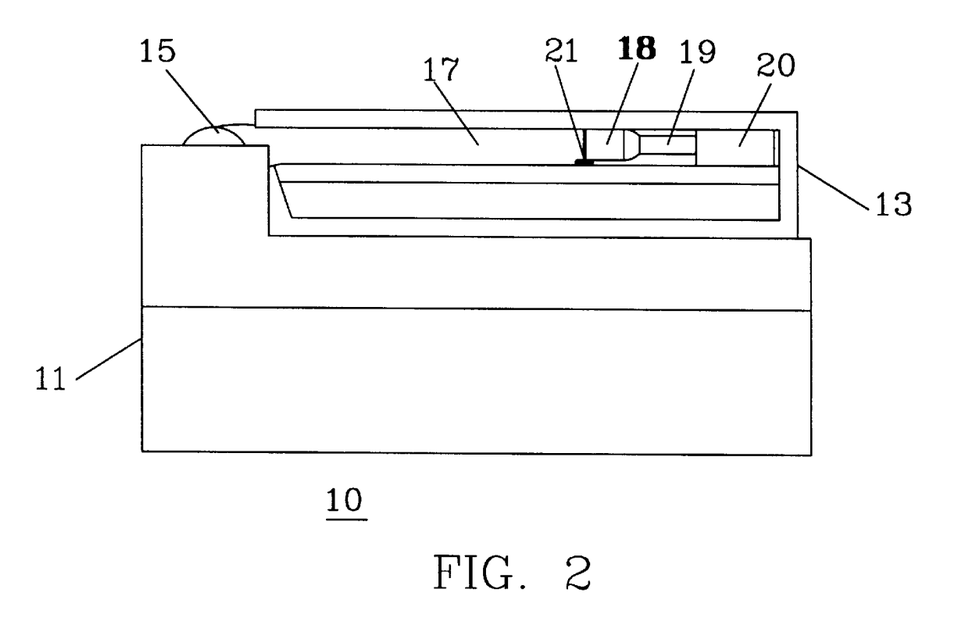
FIG. 2 shows a side view of the notebook computer closed with the display, in partial cross-section, closed.

In FIG. 2, computer 10 is shown from the side with the display 12 closed. A partial cross-sectional view of the display shows mounting panel 17, hinged panel 18, connected to mounting panel 17 by hinges, with hinge 21 shown. Squaring bar 20, which slides up and down in frame 13 is shown connected to swivel pin 19.

Figure 3:
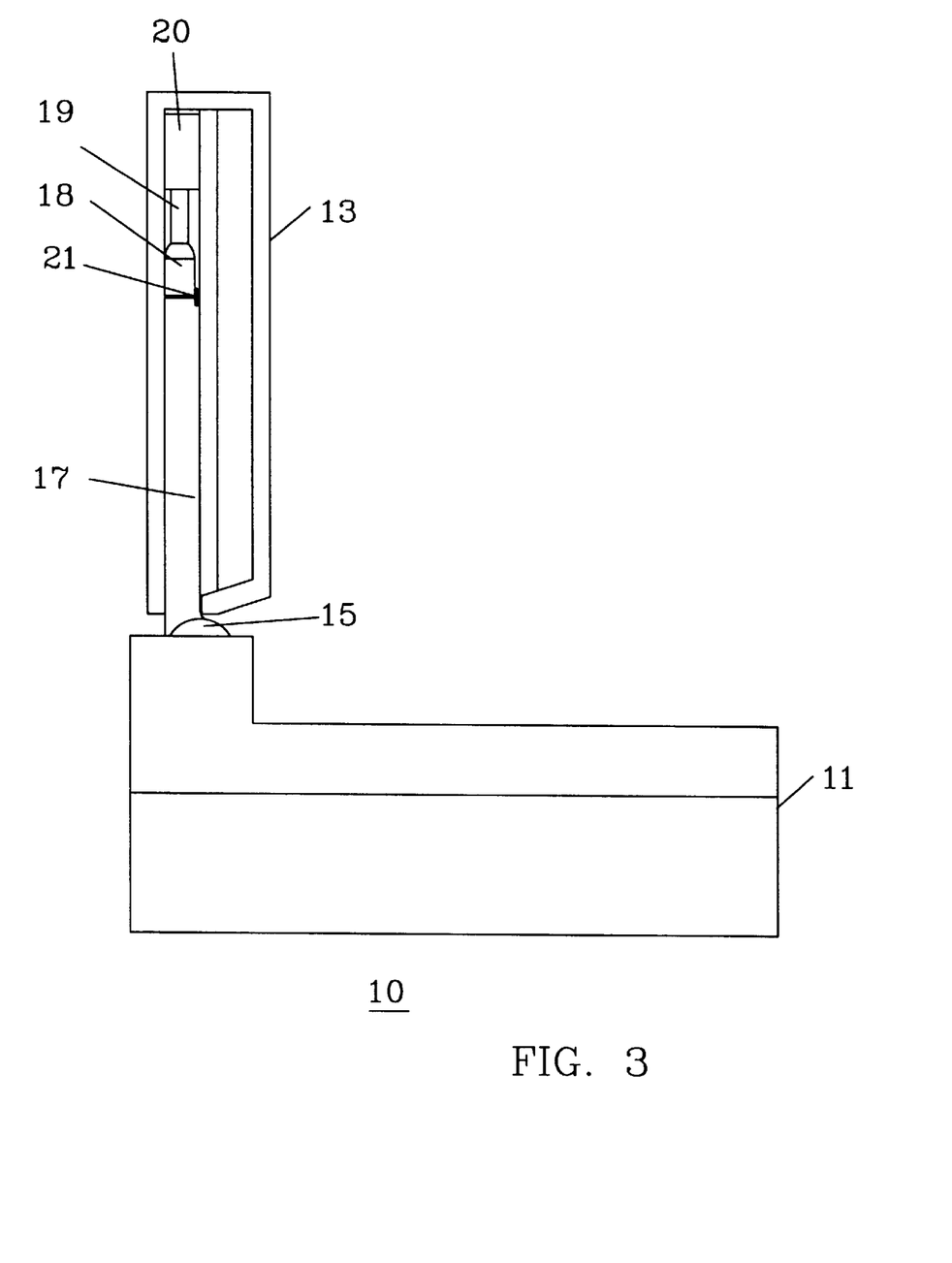
FIG. 3 is a side view as in FIG. 2, with the display raised to a vertical position.

In FIG. 3, computer 10 is illustrated as in FIG. 2, except that display 12 is raised to a vertical position. A partial cross-sectional view of the display shows mounting panel 17, hinged panel 18, connected to mounting panel 17 by hinges, with hinge 21 shown. Squaring bar 20, which slides up and down in display 12 is shown connected to swivel pin 19. This is a normal viewing position of display 12 for conventional notebook computers. Display 12 may be tilted to either side of the vertical position.

Figure 4:
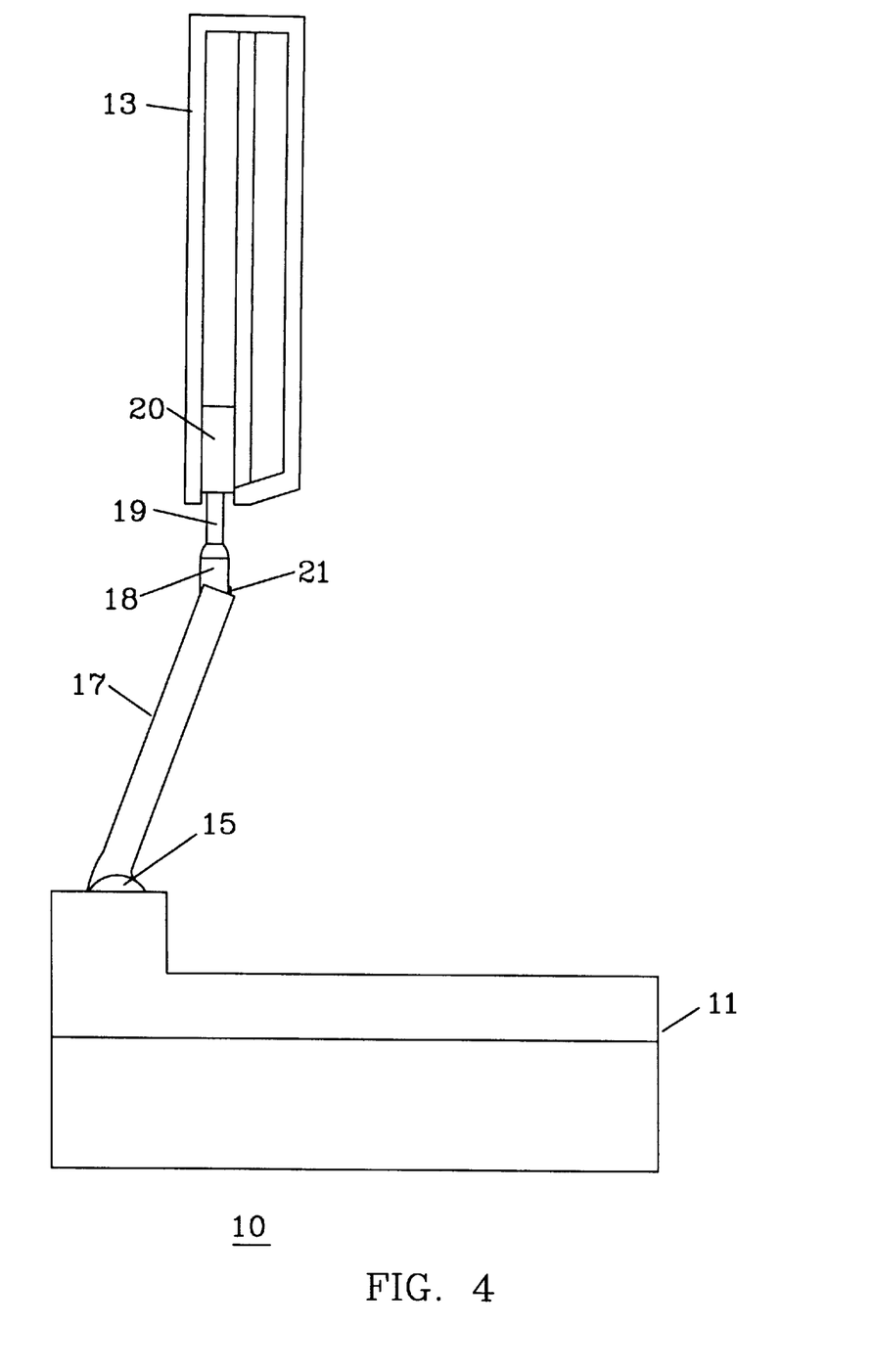
FIG. 4 is a side view as in FIG. 3 with the display elevated to its top position.

FIG. 4 is a side view of computer 10 showing the display 12 in a raised position, tilted forward, and the display vertical. Display frame 13 has been raised upward so that panel 17, hinged panel 18, and swivel pin 19 are exposed below display frame 13. With display 12 in this position, the display may be tilted forward or backward using hinges on hinged panel 18, hinge 21 is shown. Also the panel 17 may be tilted using hinges 15 and 16. Display 12 may be rotated above a vertical axis on swivel pin 19.

Figure 5:
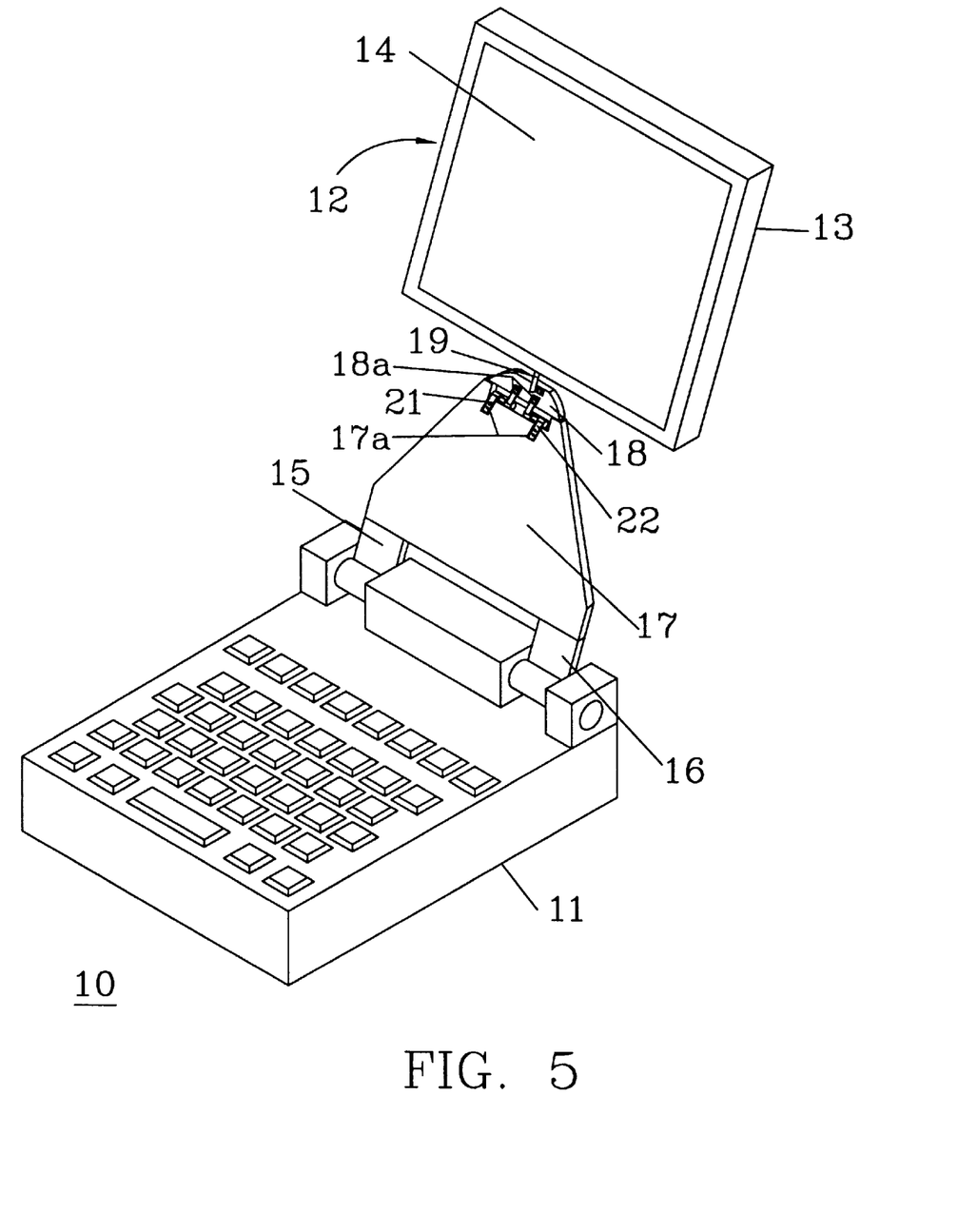
FIG. 5 is an isometric view showing the screen raised, and the tilting mechanism.

FIG. 5 is an isometric view showing display 12 in a raised position. Display 12 is raised on panel 17 so that hinge panel 18 and swivel pin 19 are exposed. Display 12 may be tilted forward or back on hinge panel 18, or panel 17 may be tilted forward or backward on hinges 15 and 16. Both tilting forward and back may both occur at the same time using hinges 15 and 16, and the hinged panel. Also display 12 may be rotated on swivel pin 19. These adjustments allows the user to position screen 14 in a position most comfortable for viewing.

Hinge panel 18 is connected to panel 17 by hinges 21 and 22. Hinges 21 and 22 are recessed in panels 17 and 18 at 17a and 18a. This allows panel 18 to tilt back and forward with respect to panel 17. Also on panel 18 is swivel pin 19 that allows display 12 to rotate both left and right from its position as shown in FIG. 5.

Figure 6:
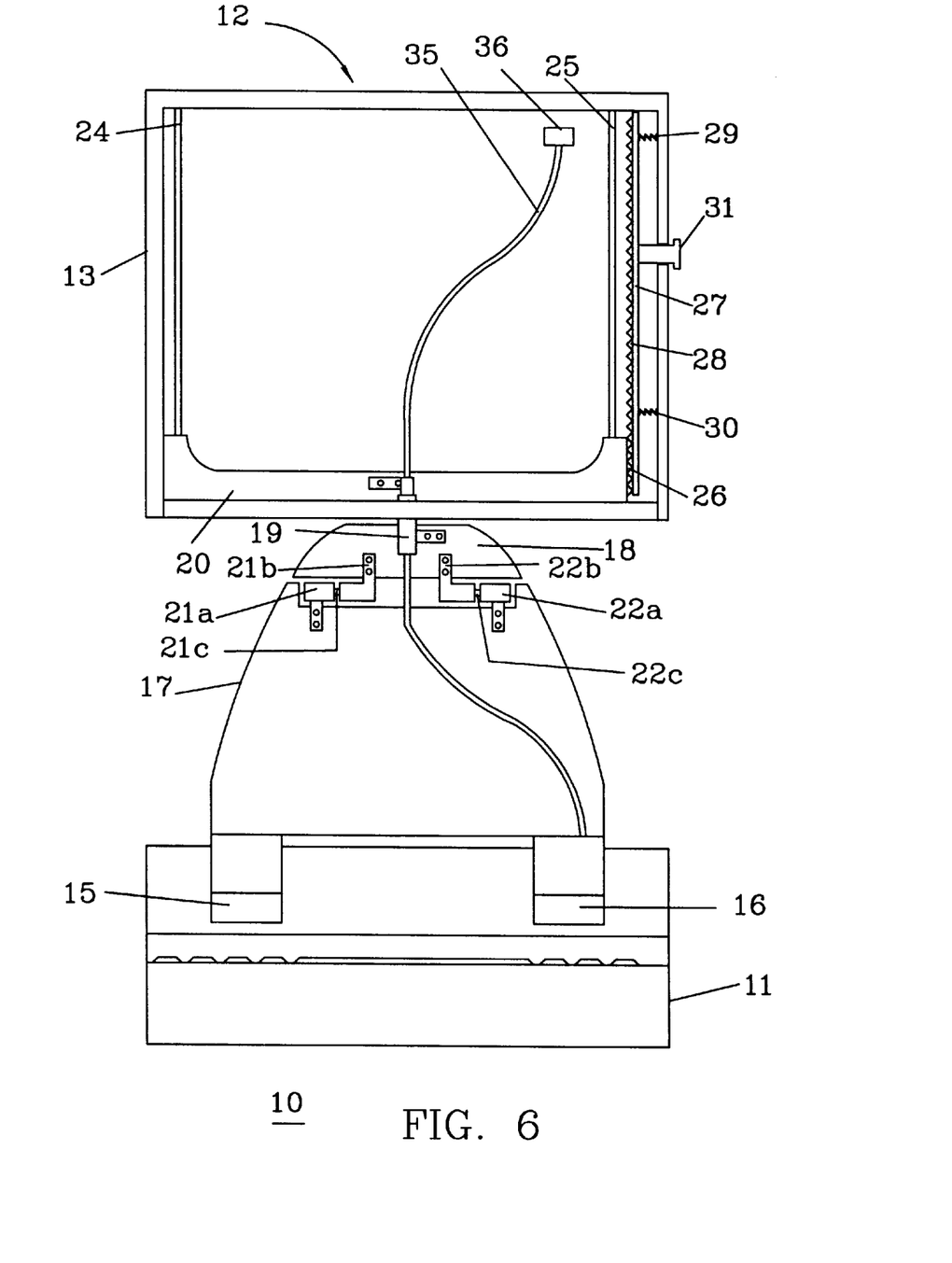
FIG. 6 is a front view showing the display in cross-section to show the raising and locking mechanism.

FIG. 6 shows computer 10 with display 12 in a fully raised position above panels 17 and 18. The display screen is removed to show a back compartment inside of display frame 13, and a more detailed view of the hinges 21 and 22 connecting panel 18 to panel 17. Each hinge is made up of two parts connected by a pin. Hinges 21 and 22 are torque hinges in that the parts of each hinge, for example parts 21a and 21b of hinge 22 do not rotate freely on pin 21c. Torque hinges are usually rated in inch-pounds, that is, for example, a 5 inch-pound hinge requires 5 inch-pounds of torque to rotate the hinge. It is in this way that a user may position panel 18 at an angle to panel 17, and it will remain in that position. Torque hinges are commonly used on notebook computers for hinges 15 and 16 so that a display may be tilted back or forward, and the display will remain in the tilted position.

Panel 18 has a swivel pin 19 that is attached between panel 18 and stabilizer bar 20. Swivel pin 19 is also a torque device so that display will not rotate freely, but will remain in the position it is placed by a computer user.

Stabilizer bar 20 is mounted on rods 24 and 25 and will move up and down rods 24 and 25. On one end of stabilizer bar 20 are teeth 26 which mesh with teeth 28 on lock bar 27. Lock bar 27 and teeth 28 hold stabilizer bar in which ever position it is placed by the computer user. When knob 31 is pulled outward, bar 27 is moved to the right (as illustrated in FIG. 6) un-meshing teeth 28 from teeth 26, allowing frame 13 to be moved up and down to a desired position. Knob 31 is then released and frame 13 is locked in the desired position. Springs 29 and 30 hold lock bar 27 to the left, holding teeth 28 meshed with teeth 26 on the end of stabilizer bar 20. It is in this manner display 12 may be moved up and down an infinite number of vertical positions between fully raised and fully lowered positions. The screen of display 12 is powered from cable 35 which extends out of computer base 11, though hinge 16, embedded in the face of panel 17, through swivel 19 to connector 36 which connects to the display screen.

Figure 7:
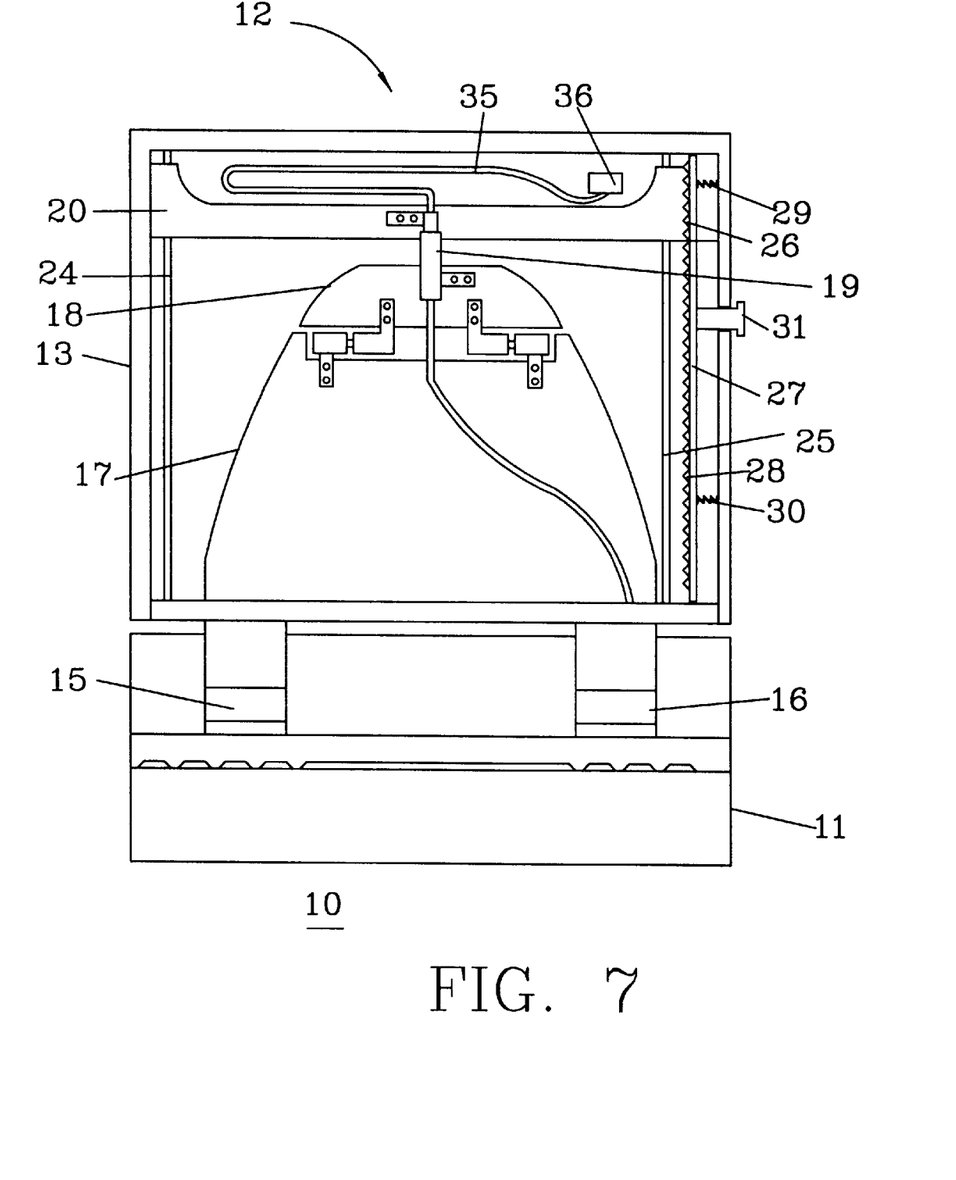
FIG. 7 is a front view showing the lowered display in cross-section.

FIG. 7 shows display 12 in a fully lowered position. Frame 13 of display 12 is released when knob 31 is pulled outward un-meshing teeth 26 on stabilizer bar 20 from teeth 28 on lock bar 27. Frame 13 moves downward over panels 17 and 18. Stabilizer bar 20 moves along rods 24 and 25 to the top of frame 13. Wire 35 folds down in the recess of stabilizer bar 20. In the down and locked position, the display 12 may be moved on hinges 15 and 16 to close display 12 over the top of computer base 11, as illustrated in FIG. 2.

Figure 8:
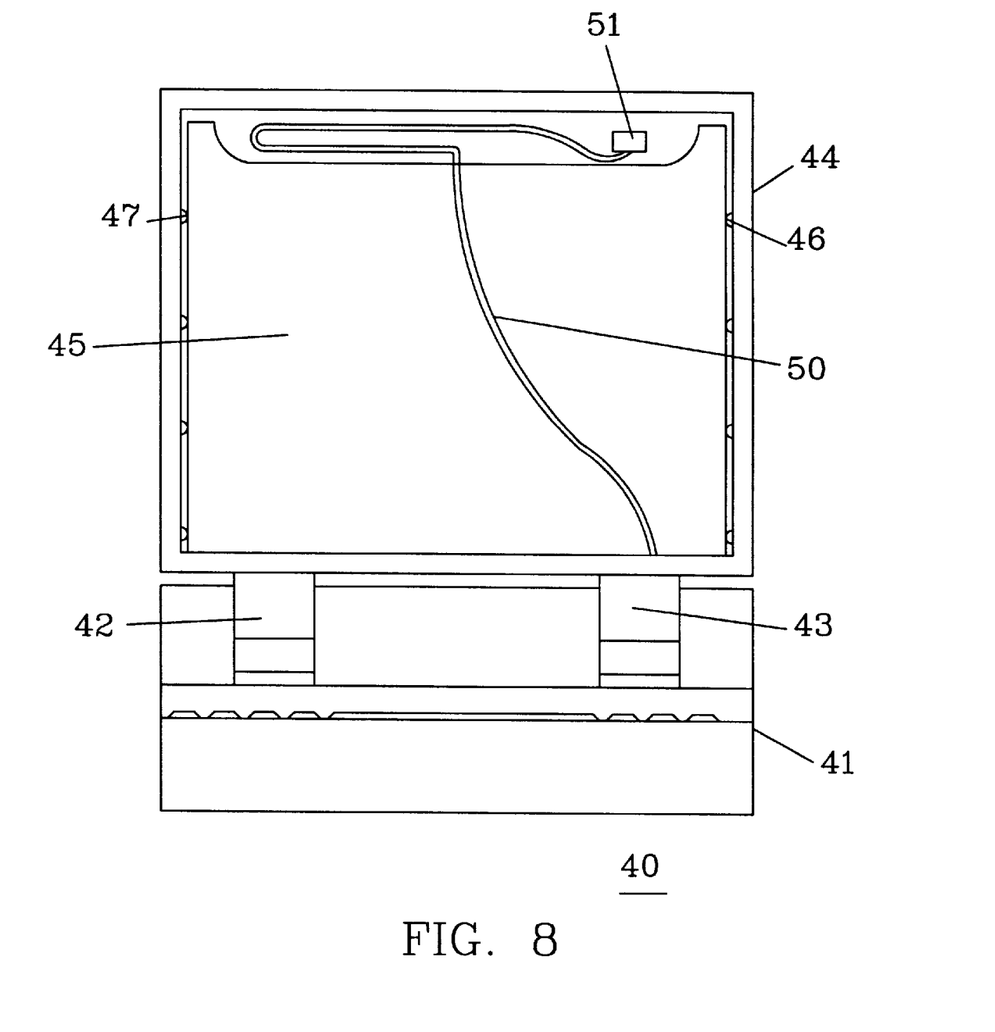
FIG. 8 is a second embodiment of the raising and locking mechanism of the display in lowered position.

FIG. 8 shows a second embodiment of the display adjustment mechanism. In this embodiment a computer 40 with base 41 has a panel 45 hinged to base 41 with hinges 42 and 43. Frame 44 is in its lowered position. Cable 50 connects the video display to base 41 and connector 51. Spring loaded rollers 46 on one side of frame 44 and rollers 47 on the opposite side of frame 44 hold panel 45 in whichever position it is placed. In the lowered position cable folds in the indentation in the top of panel 45.

Figure 9:
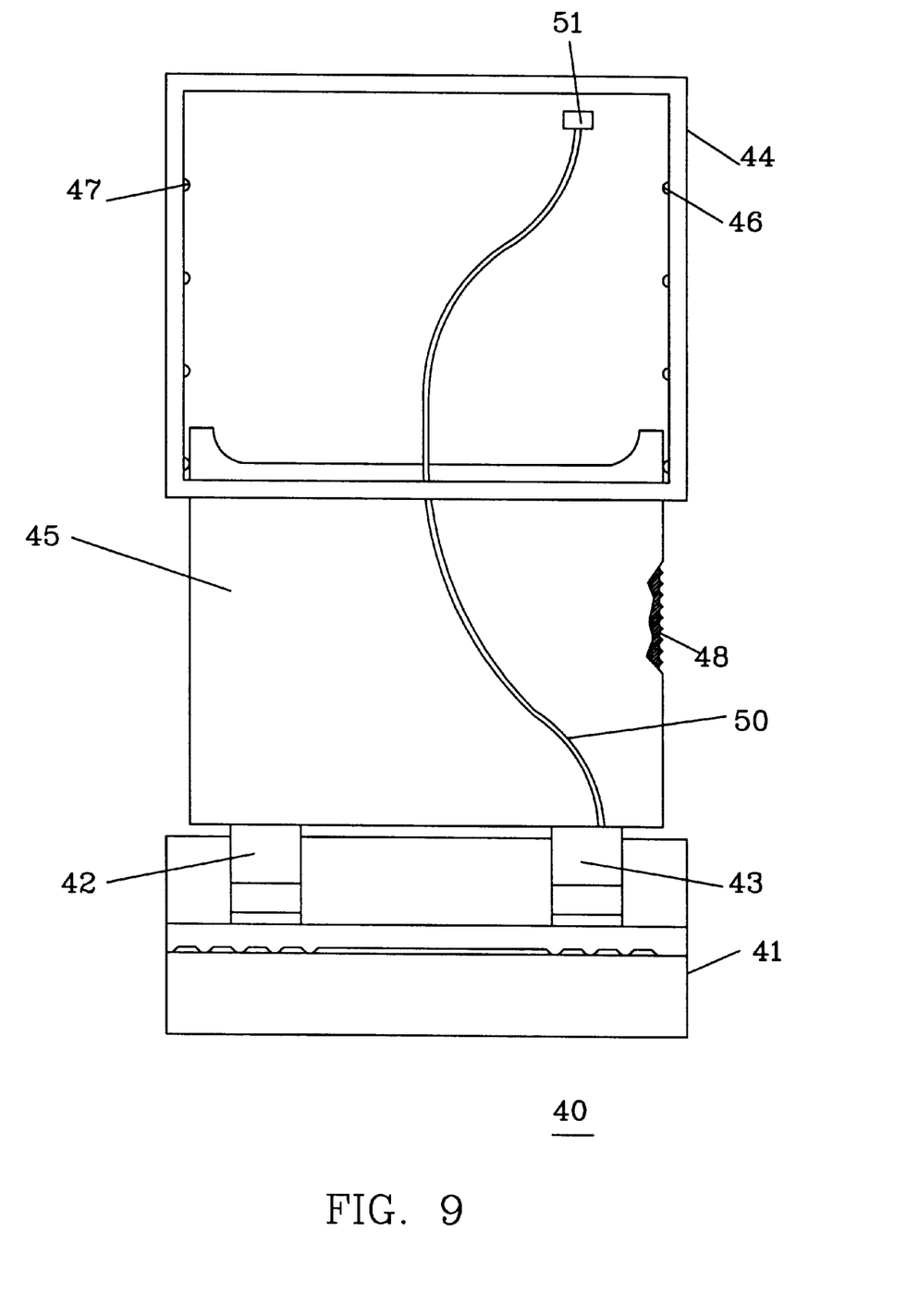
FIG. 9 shows the display of FIG. 8 is a raised position.

FIG. 9 shows frame 44 in a raised position. To help hold frame 44 in any position, panel may have, for example, indentations 48 along each side. Indentations 48 are illustrated in the cut-out section on the right side of panel 45. There may be similar indentations (not illustrated) along the left side of panel 45. This embodiment is a simplified embodiment of a video display screen adjustment mechanism according to the invention.

What is claimed:

1. A video display screen and adjustment mechanism, therefor, comprising:
    a display including a frame with a display screen mounted on a surface of said frame, and a partially enclosed compartment behind said display screen;
    a first panel hinged to a base;
    a second panel hinged to said first panel;
    a stabilizer bar attached to said second panel and slidably mounted in said partially enclosed compartment in said frame;
    whereby said display screen is movable allowing said first and second panels to be moved into and out of said partially enclosed compartment as said display screen is moved up and down.

2. The video display screen adjustment mechanism according to claim 1, including a swivel joint mounted between said second panel and said stabilizer bar.

3. The video display screen adjustment mechanism according to claim 1, including a lock bar in said frame to engage said stabilizer bar to hold said display at a desired position.

4. The video display screen adjustment mechanism according to claim 3, wherein said lock bar has teeth along one side which engage teeth on said stabilizer bar.

5. The video display screen adjustment mechanism according to claim 4, including a pressure release button attached to said lock bar to move the teeth along the lock bar away from the teeth on said stabilizer bar to release said display allowing it to be moved up and down.

6. The video display screen adjustment mechanism according to claim 5 wherein said lock bar is biased toward said stabilizer bar by at least one spring.

7. The video display screen adjustment mechanism according to claim 1, wherein said first and second panels are connected together by torque hinges having friction between connected hinge parts to prevent self-movement of one hinge part with respect to the other.

8. A video display screen and adjustment mechanism, therefor, comprising:
    a display including a frame with a display screen mounted on a surface of said frame, and a partially enclosed compartment behind said display screen;
    a first panel hinged to a base;
    a second panel hinged to said first panel; and
    a stabilizer bar slidably mounted in said partially enclosed compartment in said frame, and attached to said second panel by a swivel joint,
    whereby said display screen is movable allowing said first and second panels to be moved into and out of said partially enclosed compartment as said display screen is moved up and down.

9. The video display screen adjustment mechanism according to claim 8, including a lock bar in said frame to engage said stabilizer bar to hold said display at a desired position.

10. The video display screen adjustment mechanism according to claim 9, wherein said lock bar has teeth along one side which engage teeth on said stabilizer bar.

11. The video display screen adjustment mechanism according to claim 10, including a knob attached to said lock bar to move the teeth along the lock bar away from the teeth on said stabilizer bar to release said display allowing it to be moved up and down.

12. The video display screen adjustment mechanism according to claim 11 wherein said lock bar is biased toward said stabilizer bar by at least one spring.

13. The video display screen adjustment mechanism according to claim 8, wherein said first and second panels are connected together by torque hinges having friction between connected hinge parts to prevent self-movement of one hinge part with respect to the other.

14. The video display screen adjustment mechanism according to claim 8 wherein the display is connected to the base by a electrical cable extending to said display screen through said swivel joint.

15. A video display screen and adjustment mechanism, therefor, comprising:
    a frame with a display screen mounted on a surface of said frame, and a partially enclosed compartment behind said display screen;

a panel, hinged to a base, movable vertically within said compartment;

whereby said display screen is movable allowing said panel to be moved vertically into and out of said partially enclosed compartment as said frame with the,display screen mounted thereon is moved up and down, said compartment including spring loaded rollers which engage edges of said panel when said frame is moved up and down along the panel edges.

16. The video display screen adjustment mechanism according to claim 15 wherein said panel has a plurality of indentations along the panel edges engaging said loaded rollers to hold the frame in a desired position.

* * * * *